(12) United States Patent
Van Dyke et al.

(10) Patent No.: US 8,700,865 B1
(45) Date of Patent: Apr. 15, 2014

(54) COMPRESSED DATA ACCESS SYSTEM AND METHOD

(75) Inventors: James M. Van Dyke, Austin, TX (US);
John H. Edmondson, Arlington, MA (US); Lingfeng Yuan, Palo Alto, CA (US); Brian D. Hutsell, Fort Worth, TX (US)

(73) Assignee: NVIDIA Corporation, Santa Clara, CA (US)

( * ) Notice: Subject to any disclaimer, the term of this patent is extended or adjusted under 35 U.S.C. 154(b) by 394 days.

(21) Appl. No.: 11/592,819

(22) Filed: Nov. 2, 2006

(51) Int. Cl.
*G06F 12/00* (2006.01)

(52) U.S. Cl.
USPC .......................................................... 711/147

(58) Field of Classification Search
None
See application file for complete search history.

(56) References Cited

U.S. PATENT DOCUMENTS

| | | | |
|---|---|---|---|
| 3,815,101 A | 6/1974 | Boss et al. |
| 3,950,729 A | 4/1976 | Fletcher et al. |
| 4,654,790 A | 3/1987 | Woffinden |
| 4,797,814 A | 1/1989 | Brenza |
| 4,812,981 A | 3/1989 | Chan et al. |
| 5,123,094 A | 6/1992 | MacDougall |
| 5,179,669 A | 1/1993 | Peters |
| 5,245,702 A | 9/1993 | McIntyre et al. |
| 5,278,962 A | 1/1994 | Masuda et al. |
| 5,414,824 A | 5/1995 | Grochowski |
| 5,446,854 A | 8/1995 | Khalidi et al. |
| 5,526,504 A | 6/1996 | Hsu et al. |
| 5,649,102 A | 7/1997 | Yamauchi et al. |
| 5,649,184 A | 7/1997 | Hayashi et al. |
| 5,696,925 A | 12/1997 | Koh |
| 5,949,785 A | 9/1999 | Beasley |
| 5,963,984 A | 10/1999 | Garibay, Jr. et al. |
| 5,999,189 A * | 12/1999 | Kajiya et al. ................... 382/232 |
| 6,012,132 A | 1/2000 | Yamada et al. |
| 6,297,832 B1 | 10/2001 | Mizuyabu et al. |
| 6,298,390 B1 | 10/2001 | Matena et al. |
| 6,362,826 B1 | 3/2002 | Doyle et al. |
| 6,457,115 B1 | 9/2002 | McGrath |
| 6,470,428 B1 | 10/2002 | Milway et al. |
| 6,499,090 B1 | 12/2002 | Hill et al. |
| 6,549,997 B2 | 4/2003 | Kalyanasundharam |
| 6,636,223 B1 | 10/2003 | Morein |
| 6,658,538 B2 | 12/2003 | Arimilli et al. |
| 6,742,104 B2 * | 5/2004 | Chauvel et al. ............... 711/207 |
| 6,813,699 B1 | 11/2004 | Belgard |

(Continued)

FOREIGN PATENT DOCUMENTS

| | | |
|---|---|---|
| JP | 02288927 | 11/1990 |
| JP | 03054660 | 3/1991 |
| JP | 04182858 | 6/1992 |

OTHER PUBLICATIONS

PCMAG (Definition of: Page fault) PCMag, 1.

(Continued)

*Primary Examiner* — Hiep T Nguyen (57) ABSTRACT

A shared resource management system and method are described. In one embodiment a shared resource management system includes a plurality of engines, a shared resource, and a shared resource management unit. In one exemplary implementation the shared resource is a memory and the shared resource management unit is a memory management unit (MMU). The plurality of engines perform processing. The shared resource supports the processing. For example, a memory stores information and instructions for the engines. The shared resource management unit manages memory operations and handles access requests associated with compressed data.

19 Claims, 8 Drawing Sheets

(56) References Cited

U.S. PATENT DOCUMENTS

| | | | |
|---|---|---|---|
| 6,823,433 | B1 | 11/2004 | Barnes et al. |
| 6,839,813 | B2 | 1/2005 | Chauvel |
| 6,877,077 | B2 | 4/2005 | McGee et al. |
| 6,883,079 | B1 * | 4/2005 | Priborsky ............... 711/170 |
| 7,007,075 | B1 | 2/2006 | Coffey |
| 7,082,508 | B2 | 7/2006 | Khan et al. |
| 7,107,411 | B2 | 9/2006 | Burton et al. |
| 7,107,441 | B2 | 9/2006 | Zimmer et al. |
| 7,120,715 | B2 | 10/2006 | Chauvel et al. |
| 7,159,095 | B2 | 1/2007 | Dale et al. |
| 7,194,597 | B2 * | 3/2007 | Willis et al. ............ 711/208 |
| 7,234,038 | B1 | 6/2007 | Durrant |
| 7,275,246 | B1 | 9/2007 | Yates, Jr. et al. |
| 7,401,358 | B1 | 7/2008 | Christie et al. |
| 7,447,869 | B2 | 11/2008 | Kruger et al. |
| 7,519,781 | B1 * | 4/2009 | Wilt .......................... 711/154 |
| 7,545,382 | B1 * | 6/2009 | Montrym et al. ....... 345/530 |
| 7,730,489 | B1 | 6/2010 | Duvur et al. |
| 2002/0004823 | A1 | 1/2002 | Anderson et al. |
| 2002/0013889 | A1 | 1/2002 | Schuster et al. |
| 2002/0169938 | A1 | 11/2002 | Scott et al. |
| 2002/0172199 | A1 | 11/2002 | Scott et al. |
| 2003/0014609 | A1 | 1/2003 | Kissell |
| 2003/0167420 | A1 | 9/2003 | Parsons |
| 2003/0196066 | A1 | 10/2003 | Mathews |
| 2003/0236771 | A1 | 12/2003 | Becker |
| 2004/0025161 | A1 | 2/2004 | Chauvel et al. |
| 2004/0054833 | A1 | 3/2004 | Seal et al. |
| 2004/0078778 | A1 | 4/2004 | Leymann et al. |
| 2004/0153350 | A1 | 8/2004 | Kim et al. |
| 2004/0193831 | A1 | 9/2004 | Moyer |
| 2004/0215918 | A1 | 10/2004 | Jacobs et al. |
| 2004/0268071 | A1 | 12/2004 | Khan et al. |
| 2005/0050013 | A1 | 3/2005 | Ferlitsch |
| 2005/0097280 | A1 | 5/2005 | Hofstee et al. |
| 2005/0268067 | A1 | 12/2005 | Lee et al. |
| 2006/0004984 | A1 | 1/2006 | Morris et al. |
| 2006/0069879 | A1 * | 3/2006 | Inoue et al. ............. 711/147 |
| 2006/0069899 | A1 | 3/2006 | Schoinas et al. |
| 2006/0187945 | A1 | 8/2006 | Andersen |
| 2006/0195683 | A1 | 8/2006 | Kissell |
| 2006/0230223 | A1 | 10/2006 | Kruger et al. |
| 2006/0259732 | A1 | 11/2006 | Traut et al. |
| 2006/0259825 | A1 | 11/2006 | Cruickshank et al. |
| 2006/0282645 | A1 | 12/2006 | Tsien |
| 2006/0288174 | A1 | 12/2006 | Nace et al. |
| 2007/0067505 | A1 | 3/2007 | Kaniyur et al. |
| 2007/0073996 | A1 | 3/2007 | Kruger et al. |
| 2007/0106874 | A1 | 5/2007 | Pan et al. |
| 2007/0126756 | A1 * | 6/2007 | Glasco et al. ............ 345/620 |
| 2007/0157001 | A1 * | 7/2007 | Ritzau ....................... 711/170 |
| 2007/0168634 | A1 | 7/2007 | Morishita et al. |
| 2007/0168643 | A1 | 7/2007 | Hummel et al. |
| 2008/0263284 | A1 | 10/2008 | da Silva et al. |

OTHER PUBLICATIONS

Wikipedia, (Page Fault definition) Wikipedia, 1-4.
Osronline, (The Basics: So what is a page fault?) May-03, pp. 1-2.
Osronline, (The Basics: So what is a page fault?) May-03, p. 1-2.
Final Office Action; Mail Date Nov. 20, 2009; U.S. Appl. No. 11/591,685.
Non-Final OA Dated May 28, 2009; U.S. Appl. No. 11/523,830.
Non-Final OA Dated Sep. 15, 2008; U.S. Appl. No. 11/523,830.
Non-Final OA Dated Jan. 20, 2010; U.S. Appl. No. 11/586,756.
Final OA Dated Jun. 4, 2009; U.S. Appl. No. 11/586,756.
Non-Final OA Dated Nov. 18, 2008; U.S. Appl. No. 11/586,756.
Non Final OA Dated Aug. 19, 2009; U.S. Appl. No. 11/591,857.
Restriction Requirement Dated Apr. 27, 2009; U.S. Appl. No. 11/591,857.
Restriction Requirement; Mail Date Apr. 28, 2009; U.S. Appl. No. 11/592,076.
Non-Final OA Dated Oct. 29, 2008; U.S. Appl. No. 11/523,950.
Notice of Allowance Dated Apr. 24, 2009; U.S. Appl. No. 11/523,950.
Notice of Allowance Dated Sep. 3, 2009; U.S. Appl. No. 11/523,950.
Notice of Allowance Dated Dec. 24, 2009; U.S. Appl. No. 11/523,950.
Non-Final OA Dated Dec. 16, 2008; U.S. Appl. No. 11/586,826.
Final Office Action Dated Nov. 23, 2009; U.S. Appl. No. 11/592,106.
Final OA Dated Nov. 9, 2009; U.S. Appl. No. 11/591,629.
Non-Final OA Dated Feb. 20, 2009; U.S. Appl. No. 11/591,629.
Final OA Dated Nov. 24, 2009; U.S. Appl. No. 11/592,780.
Non-Final OA Dated Apr. 2, 2009; U.S. Appl. No. 11/592,780.
Non-Final OA Dated Sep. 24, 2009; U.S. Appl. No. 11/588,177.
Final OA Dated May 21, 2009; U.S. Appl. No. 11/588,177.
Non-Final OA Dated Nov. 13, 2008; U.S. Appl. No. 11/588,177.
Final OA Dated Dec. 8, 2009; U.S. Appl. No. 11/591,856.
Non-Final OA Dated May 11, 2009; U.S. Appl. No. 11/591,856.
Final OA Dated Oct. 14, 2009; U.S. Appl. No. 11/586,825.
Non-Final OA Dated Mar. 18, 2009; U.S. Appl. No. 11/586,825.
Non Final Office Action; Mail Date Apr. 27, 2009; U.S. Appl. No. 11/591,685.
Notice of Allowance; Mail Date Jan. 29, 2010; U.S. Appl. No. 11/592,076.
Final Office Action; Mail Date Mar. 16, 2010; U.S. Appl. No. 11/523,830.
Restriction Requirement; Mail Date Apr. 27, 2009; U.S. Appl. No. 11/591,857.
Notice of Allowance; Mail Date Jun. 22, 2009; U.S. Appl. No. 11/586,826.
Notice of Allowance; Mail Date Dec. 14, 2009; U.S. Appl. No. 11/586,826.
Non Final Office Action Dated Apr. 1, 2009; U.S. Appl. No. 11/592,106.
Non Final Office Action; Mail Date Aug. 19, 2009; U.S. Appl. No. 11/592,076.
Non Final Office Action; Mail Date Feb. 22, 2010; U.S. Appl. No. 11/586,825.
Non Final Office Action, Mail Date May 11, 2010, U.S. Appl. No. 11/591,685.
Final Office Action, Mail Date Oct. 27, 2010, U.S. Appl. No. 11/591,685.
Restriction, Mail Date Apr. 28, 2009, U.S. Appl. No. 11/592,076.
Notice of Allowance, Mail Date Jan. 29, 2010, U.S. Appl. No. 11/592,076.
Notice of Allowance, Mail Date May 4, 2010, U.S. Appl. No. 11/592,076.
Notice of Allowance, Mail Date Aug. 13, 2010, U.S. Appl. No. 11/592,076.
Notice of Allowance, Mail Date Nov. 26, 2010, U.S. Appl. No. 11/592,076.
Restriction Dated Aug. 10, 2010; U.S. Appl. No. 12/650,068.
Final Office Action Dated Mar. 16, 2010; U.S. Appl. No. 11/523,830.
Notice of Allowance Dated Jun. 28, 2010; U.S. Appl. No. 11/523,830.
Notice of Allowance Dated Sep. 2, 2010; U.S. Appl. No. 11/523,830.
Notice of Allowance Dated Jan. 20, 2011; U.S. Appl. No. 11/523,830.
Final Office Action Dated Aug. 3, 2010; U.S. Appl. No. 11/586,756.
Notice of Allowance Dated Dec. 27, 2010; U.S. Appl. No. 11/586,756.
Restriction Dated Apr. 27, 2009; U.S. Appl. No. 11/591,857.
Office Action Dated Dec. 7, 2010; U.S. Appl. No. 11/591,857.
Final Office Action Dated Jun. 25, 2010; U.S. Appl. No. 11/592,106.
Office Action Dated Dec. 16, 2010; U.S. Appl. No. 11/592,106.
Office Action Dated Sep. 19, 2008; U.S. Appl. No. 11/523,926.
Final Office Action Dated Apr. 10, 2009; U.S. Appl. No. 11/523,926.
Office Action Dated Oct. 11, 2009; U.S. Appl. No. 11/523,926.
Notice of Allowance Dated Mar. 29, 2010; U.S. Appl. No. 11/523,926.
Notice of Allowance Dated Jul. 9, 2010; U.S. Appl. No. 11/523,926.
Notice of Allowance Dated Oct. 27, 2010; U.S. Appl. No. 11/523,926.
Notice of Allowance Dated Jul. 21, 2010; U.S. Appl. No. 11/523,950.
Notice of Allowance Dated Nov. 3, 2010; U.S. Appl. No. 11/523,950.
Notice of Allowance Dated Jun. 22, 2009; U.S. Appl. No. 11/586,950.

(56) References Cited

OTHER PUBLICATIONS

Notice of Allowance Dated Dec. 14, 2009; U.S. Appl. No. 11/586,950.
Office Action Dated May 27, 2010; U.S. Appl. No. 11/591,629.
Office Action Dated Nov. 3, 2010; U.S. Appl. No. 11/591,629.
Office Action Dated Apr. 28, 2010; U.S. Appl. No. 11/592,780.
Office Action Dated Oct. 13, 2010; U.S. Appl. No. 11/592,780.
Final Office Action Dated Apr. 27, 2010; U.S. Appl. No. 11/255,177.
Office Action Dated Apr. 27, 2010; U.S. Appl. No. 11/591,856.
Notice of Allowance Dated Nov. 12, 2010; U.S. Appl. No. 11/591,856.
Office Action Dated Feb. 22, 2010; U.S. Appl. No. 11/586,825.
Notice of Allowance Dated Aug. 16, 2010; U.S. Appl. No. 11/586,825.
Notice of Allowance Dated Nov. 26, 2010; U.S. Appl. No. 11/586,825.
Chaudhuri, "The impact of NACKs in shared memory scientific applications", Feb. 2004, IEEE, IEEE Transactions on Parallel and distributed systems vol. 15, No. 2, p. 134-150.
Laibinis, "Formal Development of Reactive Fault Tolerant Systems", Sep. 9, 2005, Springer, Second International Workshop, Rise 2005, p. 234-249.
Wikipedia, Memory Address, Oct. 29, 2010, pp. 1-4, www.wikipedia.com.
Wikipedia, Physical Address, Apr. 17, 2010, pp. 1-2, www.wikipedia.com.
Non-Final Office Action, Mailed May 11, 2010; U.S. Appl. No. 11/591,685.
Final Office Action, Mailed Oct. 27, 2010; U.S. Appl. No. 11/591,685.
Restriction, Mailed Apr. 28, 2009; U.S. Appl. No. 11/592,076.
Notice of Allowance, Mailed Jan. 29, 2010; U.S. Appl. No. 11/592,076.
Notice of Allowance, Mailed May 4, 2010; U.S. Appl. No. 11/592,076.
Notice of Allowance, Mailed Aug. 13, 2010; U.S. Appl. No. 11/592,076.
Notice of Allowance, Mailed Nov. 26, 2010; U.S. Appl. No. 11/592,076.
Notice of Restriction, Mailed Aug. 10, 2010; U.S. Appl. No. 12/650,068.
Final Office Action, Mailed Mar. 16, 2010; U.S. Appl. No. 11/523,830.
Notice of Allowance, Mailed Jun. 28, 2010; U.S. Appl. No. 11/523,830.
Notice of Allowance, Mailed Sep. 2, 2010; U.S. Appl. No. 11/523,830.
Notice of Allowance, Mailed Jan. 20, 2011; U.S. Appl. No. 11/523,830.
Notice of Allowance, Mailed May 5, 2011; U.S. Appl. No. 11/523,830.
Final Office Action, Mailed Aug. 1, 2010; U.S. Appl. No. 11/586,756.
Notice of Allowance, Mailed Dec. 27, 2010; U.S. Appl. No. 11/586,756.
Notice of Allowance, Mailed May 12, 2011; U.S. Appl. No. 11/586,756.
Office Action, Mailed Apr. 27, 2009; U.S. Appl. No. 11/591,857.
Non-Final Office Action, Mailed Dec. 7, 2010; U.S. Appl. No. 11/591,857.
Notice of Allowance, Mailed Mar. 18, 2011; U.S. Appl. No. 11/591,857.
Final Office Action, Mailed Jun. 25, 2010; U.S. Appl. No. 11/592,106.
Non-Final Office Action, Mailed Dec. 16, 2010; U.S. Appl. No. 11/592,106.
Non-Final Office Action, Mailed Sep. 19, 2008; U.S. Appl. No. 11/523,926.
Final Office Action, Mailed Apr. 10, 2009; U.S. Appl. No. 11/523,926.
Non-Final Office Action, Mailed Oct. 1, 2009; U.S. Appl. No. 11/523,926.
Notice of Allowance; Mailed Mar. 29, 2010; U.S. Appl. No. 11/523,926.
Notice of Allowance; Mailed Jul. 9, 2010; U.S. Appl. No. 11/523,926.
Notice of Allowance; Mailed Oct. 27, 2010; U.S. Appl. No. 11/523,926.
Notice of Allowance; Mailed Jul. 21, 2010; U.S. Appl. No. 11/523,950.
Notice of Allowance; Mailed Nov. 3, 2010; U.S. Appl. No. 11/523,950.
Notice of Allowance, Mailed Jun. 22, 2009; U.S. Appl. No. 11/586,826.
Notice of Allowance, Mailed Dec. 14, 2009; U.S. Appl. No. 11/586,826.
Non-Final Office Action, Mailed May 27, 2010; U.S. Appl. No. 11/591,629.
Non-Final Office Action, Mailed Nov. 3, 2010; U.S. Appl. No. 11/591,629.
Final Office Action, Mailed Jun. 8, 2011; U.S. Appl. No. 11/591,629.
Non-Final Office Action, Mailed Apr. 28, 2010; U.S. Appl. No. 11/592,780.
Non-Final Office Action, Mailed Oct. 13, 2010; U.S. Appl. No. 11/592,780.
Final Office Action, Mailed Apr. 27, 2010; U.S. Appl. No. 11/588,177.
Non-Final Office Action, Mailed Apr. 27, 2010; U.S. Appl. No. 11/591,856.
Notice of Allowance, Mailed Nov. 12, 2010; U.S. Appl. No. 11/591,856.
Notice of Allowance, Mailed Mar. 9, 2011; U.S. Appl. No. 11/591,856.
Non-Final Office Action, Mailed Feb. 22, 2010; U.S. Appl. No. 11/586,825.
Notice of Allowance, Mailed Aug. 16, 2010; U.S. Appl. No. 11/586,825.
Notice of Allowance, Mailed Nov. 26, 2010; U.S. Appl. No. 11/586,825.
Notice of Allowance, Mailed Mar. 4, 2011; U.S. Appl. No. 11/586,825.
Non-Final Office Action; Mail Date: May 6, 2011; U.S. Appl. No. 11/591,685.
Notice of Allowance; Mail Date: Mar. 17, 2011; U.S. Appl. No. 11/592,076.
Notice of Allowance; Mail Date: Jun. 29, 2011; U.S. Appl. No. 11/592,076.
Non-Final Office Action; Mail Date: Feb. 1, 2011; U.S. Appl. No. 12/650,068.
Final Office Action; Mail Date: Aug. 9, 2011; U.S. Appl. No. 12/650,068.
Notice of Allowance; Mail Date: Jul. 21, 2011; U.S. Appl. No. 11/523,950.
Notice of Allowance; Mail Date: Aug. 25, 2011; U.S. Appl. No. 11/586,756.
Final Office Action; Mail Date: May 4, 2010; U.S. Appl. No. 11/591,857.
Notice of Allowance; Mail Date: Jul. 21, 2011; U.S. Appl. No. 11/591,857.
Final Office Action; Mail Date: Jul. 5, 2011; U.S. Appl. No. 11/592,106.
Notice of Allowance; Mail Date: Feb. 3, 2011; U.S. Appl. No. 11/523,926.
Notice of Allowance; Mail Date: May 23, 2011; U.S. Appl. No. 11/523,926.
Notice of Allowance; Mail Date: Aug. 23, 2011; U.S. Appl. No. 11/523,926.
Notice of Allowance; Mail Date: Jun. 9, 2011; U.S. Appl. No. 11/523,950.
Notice of Allowance; Mail Date: Aug. 30, 2011; U.S. Appl. No. 11/523,950.
Notice of Allowance; Mail Date: Feb. 16, 2011; U.S. Appl. No. 11/586,826.

(56) References Cited

OTHER PUBLICATIONS

Notice of Allowance; Mail Date: Jul. 26, 2011; U.S. Appl. No. 11/586,826.
Final Office Action; Mail Date: Apr. 12, 2011; U.S. Appl. No. 11/592,780.
Non-Final Office Action; Mail Date: Jun. 7, 2011; U.S. Appl. No. 11/588,177.
Notice of Allowance; Mail Date: Jun. 17, 2011; U.S. Appl. No. 11/591,856.
Notice of Allowance; Mail Date: Jun. 16, 2011; U.S. Appl. No. 11/586,825.
Notice of Allowance; Mail Date: Aug. 9, 2011; U.S. Appl. No. 11/586,825.
Final Office Action Mailed Nov. 16, 2011; U.S. Appl. No. 11/591,685.
Notice of Allowance Mailed Oct. 14, 2011; U.S. Appl. No. 11/592,076.
Non-Final Office Action Mailed Nov. 16, 2011; U.S. Appl. No. 12/650,068.
Notice of Allowance Mailed Oct. 26, 2011; U.S. Appl. No. 11/523,830.
Notice of Allowance Mailed Jan. 13, 2012; U.S. Appl. No. 11/586,756.
Notice of Allowance Mailed Oct. 28, 2011; U.S. Appl. No. 11/591,857.
Non-Final Office Action Mailed Dec. 2, 2011; U.S. Appl. No. 11/592,106.
Notice of Allowance Mailed Oct. 28, 2011; U.S. Appl. No. 11/523,926.
Notice of Allowance Mailed Nov. 14, 2011; U.S. Appl. No. 11/523,950.
Notice of Allowance Mailed Dec. 27, 2011; U.S. Appl. No. 11/586,826.
Notice of Allowance Mailed Dec. 8, 2011; U.S. Appl. No. 11/586,825.
Non-Final Office Action Mailed Nov. 1, 2011; U.S. Appl. No. 11/592,780.
Final Office Action Mailed Nov. 29, 2011; U.S. Appl. No. 11/588,177.
Notice of Allowance Dated May 30, 2012; U.S. Appl. No. 11/591,685.
Notice of Allowance Dated May 15, 2012; U.S. Appl. No. 11/586,756.
Notice of Allowance Dated Feb. 22, 2012; U.S. Appl. No. 11/591,685.
Notice of Allowance Dated May 10, 2012; U.S. Appl. No. 11/523,830.
Notice of Allowance Dated Jul. 6, 2012; U.S. Appl. No. 12/650,068.
Notice of Allowance Dated May 25, 2012; U.S. Appl. No. 11/591,857.
Final Office Action Dated May 10, 2012; U.S. Appl. No. 11/592,106.
Notice of Allowance Dated Jun. 1, 2012; U.S. Appl. No. 11/523,926.
Notice of Allowance Dated Jul. 5, 2012; U.S. Appl. No. 11/586,826.
Notice of Allowance Dated Mar. 21, 2012; U.S. Appl. No. 11/586,825.
Final Office Action Dated May 7, 2012; U.S. Appl. No. 11/592,780.
Notice of Allowance Dated Apr. 12, 2012; U.S. Appl. No. 11/591,856.
Notice of Allowance Dated Jun. 7, 2012; U.S. Appl. No. 11/591,856.
Notice of Allowance Dated Jul. 6, 2012; U.S. Appl. No. 11/586,825.
Notice of Allowance Dated Jan. 5, 2012; U.S. Appl. No. 11/591,856.
Notice of Allowance Dated Jan. 27, 2012; U.S. Appl. No. 11/592,076.
Notice of Allowance Dated May 10, 2012; U.S. Appl. No. 11/592,076.
Notice of Allowance Dated Sep. 26, 2011; U.S. Appl. No. 11/591,856.
Notice of Allowance Dated Feb. 2, 2012; U.S. Appl. No. 11/523,830.
Notice of Allowance Dated May 1, 2012; U.S. Appl. No. 12/650,068.
Notice of Allowance Dated Feb. 24, 2012; U.S. Appl. No. 11/523,926.
Notice of Allowance Dated Feb. 10, 2012; U.S. Appl. No. 11/591,857.
Guelfi et al., (Rapid Integration of Software Engineering Techniques) 2005, Second International Workshop, 9 pages.
PCMAG (Definition of: Page fault) PCMag, 1, Mar. 27, 2009.
Wikipedia, (Page Fault definition) Wikipedia, 1-4, Mar. 9, 2009.
Notice of Allowance Dated Nov. 20, 2012; U.S. Appl. No. 11/586,756.
Notice of Allowance Dated Sep. 26, 2012; U.S. Appl. No. 11/591,685.
Notice of Allowance Dated Aug. 16, 2012; U.S. Appl. No. 11/523,830.
Notice of Allowance Dated Sep. 17, 2012; U.S. Appl. No. 12/650,068.
Notice of Allowance Dated Aug. 29, 2012; U.S. Appl. No. 11/523,830.
Notice of Allowance Dated Sep. 18, 2012; U.S. Appl. No. 11/591,857.
Notice of Allowance Dated Sep. 12, 2012; U.S. Appl. No. 11/523,926.
Office Action Dated Sep. 14, 2012; U.S. Appl. No. 11/591,629.
Notice of Allowance Dated Sep. 14, 2012: U.S. Appl. No. 11/588,177.
Notice of Allowance Dated Sep. 17, 2012; U.S. Appl. No. 11/591,856.
Notice of Allowance Dated Oct. 12, 2012; U.S. Appl. No. 11/586,825.
Wikipedia, (CPU Cache Definition), www.wikipedia.com, pp. 1-16, Jan. 26, 2010.
Notice of Allowance Dated Jan. 14, 2013; U.S. Appl. No. 11/591,685.
Notice of Allowance Dated Jan. 28, 2013; U.S. Appl. No. 12/650,068.
Notice of Allowance Dated Feb. 20, 2013; U.S. Appl. No. 11/586,756.
Notice of Allowance Dated Dec. 31, 2012; U.S. Appl. No. 11/591,857.
Notice of Allowance Dated Feb. 1, 2013; U.S. Appl. No. 11/591,857.
Non-Final Office Action Dated Jan. 3, 2013; U.S. Appl. No. 11/592,106.
Notice of Allowance Dated Apr. 2, 2013; U.S. Appl. No. 11/523,950.
Notice of Allowance Dated Feb. 7, 2013; U.S. Appl. No. 11/586,826.
Notice of Allowance Dated Mar. 7, 2013; U.S. Appl. No. 11/591,629.
Notice of Allowance Dated Mar. 18, 2013; U.S. Appl. No. 11/588,177.
Notice of Allowance Dated Jan. 17, 2013; U.S. Appl. No. 11/1591,856.
Notice of Allowance Dated May 8, 2013; U.S. Appl. No. 11/591,685.
Notice of Allowance; Dated May 10, 2013; U.S. Appl. No. 12/650,068.
Notice of Allowance; Dated May 23, 2013; U.S. Appl. No. 11/591,857.
Final Office Action; Dated Jun. 6, 2013; U.S. Appl. No. 11/592,106.
Notice of Allowance; Dated May 16, 2013; U.S. Appl. No. 11/523,950.
Notice of Allowance; Dated Apr. 30, 2013; U.S. Appl. No. 11/591,856.
Harper et al., (Rapid recovery from transient Faults in the fault tolerant processor with fault-tolerant shared memory) 1990, IEEE, p. 350-359.
Ooi, (Fault Tolerant Architecture in a cache memory control LSI), 1992, IEEE, 507-514.
Oracle, (Oracle 8i Parallel server), 1999, Oracle, Release 2 (8.1.6) 1-216.
PCMAG (Definition of: Page fault) PCMag, 1, 2009.
Shalan. (Dynamic Memory Management for embedded real-time multiprocessor system on a chip), 2000, ACM. 180-186.
Shalan. (Dynamic Memory Management for embedded real-time multiprocessor system on a chip), 2003, Georgia Inst. Of Tech. 1-118.
Wikipedia, (Page Fault definition) Wikipedia, 1-4, 2009.
Notice of Allowance Dated Aug. 1, 2013; U.S. Appl. No. 11/591,685.
Notice of Allowance Dated Jul. 29, 2013; U.S. Appl. No. 12/650,068.
Notice of Allowance Dated Jul. 18, 2013; U.S. Appl. No. 11/586,756.

(56) References Cited

OTHER PUBLICATIONS

Non-Final Office Action Dated Oct. 3, 2013; U.S. Appl. No. 11/592,106.
Notice of Allowance Dated Aug. 26, 2013; U.S. Appl. No. 11/586,826.
Notice of Allowance Dated Jul. 30, 2013; U.S. Appl. No. 11/591,629.
Non-Final Office Action Dated Sep. 10, 2013; U.S. Appl. No. 11/592,780.
Notice of Allowance Dated Sep. 12, 2013; U.S. Appl. No. 11/588,177.

* cited by examiner

410
Receiving access requests.

420
Examining a page table entry associated with the access request.

430
Forwarding a first and second address wherein the first address is to a data memory location and the second address is to a compression tag location.

COMPRESSED DATA ACCESS SYSTEM AND METHOD

FIELD OF THE INVENTION

The present invention relates to the field of information processing. In particular, the present invention relates to a system and method for shared resource access management.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data in most areas of business, science, education and entertainment. Electronic systems providing these advantageous results often include shared resources. However, designing and building systems that efficiently access and utilize a shared resource is often challenging. Coordinating the access to shared resources can be highly complex and resource intensive.

Memory or storage is usually a very important component of a number of systems. Memories typically store information utilized by a system in performance of a number of different tasks. Other components of a system typically request access to a memory in order to retrieve (e.g., "read") information from or forward (e.g., "write') information to the memory. Different types of memories (e.g., bulk storage, main memory, removable memory etc.) and or memory "spaces" (e.g., virtual, physical, etc.) can be utilized to support information storage.

Different types of memory can potentially offer different features. For example, different types of memories typically have different relative storage capacities and relatively different access speeds. Traditionally, systems that have relatively large storage capacity have relatively slow access speeds and systems that have relatively fast access speeds have relatively small storage capacities. For example, main system memories are relatively fast compared to bulk storage memories but typically store less information. A number of systems transfer chunks of information between relatively fast small memories and relatively slow bulk memories in an attempt to optimize speed and capacity.

Some systems and applications also attempt to increase storage efficiency through various information compression techniques. Conventional information compression techniques often attempt to take advantage of repetitive information to achieve various compression ratios. Traditional approaches usual store reduced version of the information and compression information that is used to reformulate a full version by using the ratios to expand the repetitive information. Conventional compression information tracking and storage approaches are often limited in flexibility. For example, traditional approaches often utilize a limited number of tiled regions.

Traditional computer systems also often run programs that utilize virtual memory space addressing. Typically the computer system performs a translation between the virtual memory space addressing and physical memory space addressing. However, coordinating virtual address space to physical address space translation with compression techniques can be relatively complex and hindered by conventional compression information storage approaches.

SUMMARY

A shared resource management system and method are described. In one embodiment a shared resource management system includes a plurality of engines, a shared resource, and a shared resource management unit. In one exemplary implementation the shared resource is a memory and the shared resource management unit is a memory management unit (MMU). The plurality of engines perform processing. The shared resource supports the processing. For example, a memory stores information and instructions for the engines. The shared resource management unit manages memory operations and handles access requests associated with compressed data.

DESCRIPTION OF THE DRAWINGS

The accompanying drawings, which are incorporated in and form a part of this specification, illustrate embodiments of the invention by way of example and not by way of limitation. The drawings referred to in this specification should be understood as not being drawn to scale except if specifically noted.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

In one embodiment of the present invention, compression status indication (e.g., compression tag) in physical storage (in one exemplary embodiment referred to as "TAG RAM") is allocated and managed. The page table entry includes a physical starting address in the compression status storage area corresponding to the translated virtual page. The PTE also includes a compression format field which may indicate the number of bits in a compressible unit as well as the compression format type. In one exemplary implementation, the compression format indicates the compression ratio (e.g., 4 to 1, 8 to 1, etc) in a compressible unit. In one embodiment, each physical page size includes a predetermined number of compressible units (e.g., tiles region, bounded areas, etc). It is appreciated; the compression status can be stored in a variety of storage areas. In one exemplary implementation, the compression status storage resource is stored in a TAG RAM.

In one exemplary implementation, software directly manages the compression status storage resource allowing increased flexibility and facilitating increased performance. For example, when performing virtual to physical address translations for a compression-enabled surface, in addition to the virtual to physical address translation information, a separate starting address into the compression status resource is provided. In one embodiment, page table entry information includes both the virtual to physical address translation information and compression status resource address indication. In one embodiment, page table entry information includes compression format information.

Figure 1:
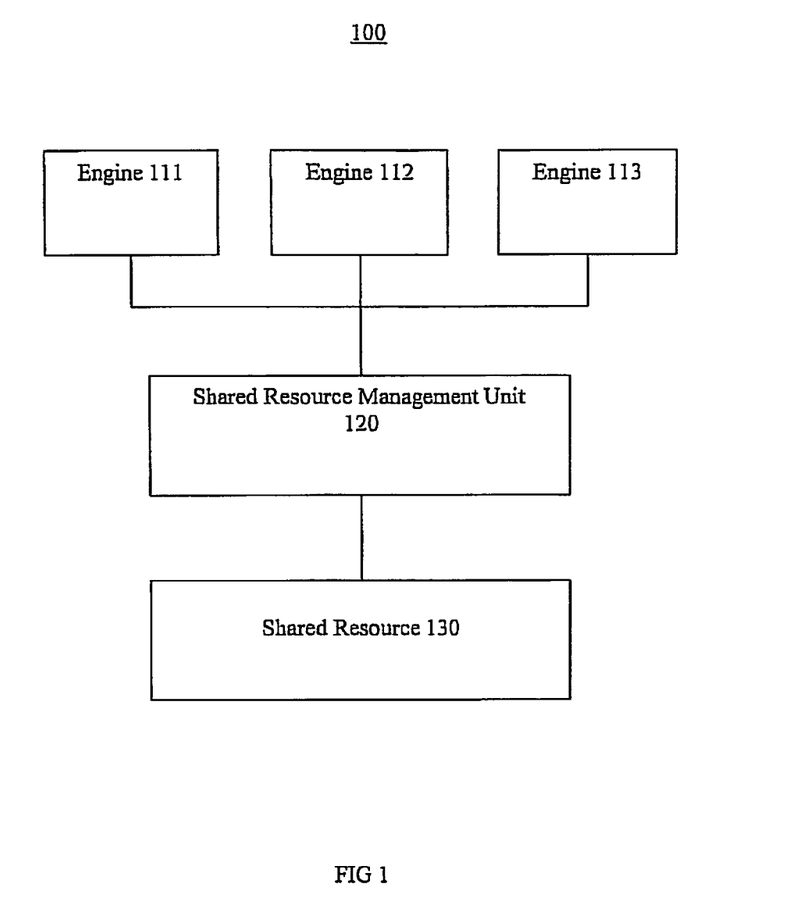
FIG. 1 is a block diagram of an exemplary shared resource management system in accordance with one embodiment of the present invention.

FIG. 1 is a block diagram of an exemplary shared resource management system 100 in accordance with one embodiment of the present invention. Exemplary shared resource management system 100 includes engine 111, engine 112, engine 113, shared resource management unit 120 and shared resource 130. Engine 111, engine 112, and engine 113 are communicatively coupled to shared resource management unit 120 which in turn is communicatively coupled to shared resource 130.

The components of exemplary shared resource management system 100 cooperatively operate to facilitate efficient management of access to a shared resource by a plurality of engines. Engine 111, engine 112 and engine 113 perform various processing activities. In one embodiment, each engine can perform processing activities for a variety of clients. Shared resource 130 supports the processing by engines 111, 112 and 113. In one exemplary implementation, shared resource 130 is a memory for storing information utilized by engines 111, 112, and/or 113. Shared resource management unit 120 independently controls access to the shared resource 130. Shared resource management unit 120 also handles access requests to information that is associated with compressed data.

By independently controlling access to the shared resource 130 and handling access requests associated with compressed data, shared resource management system 100 facilitates efficient access operations. For example, the shared resource management unit 120 takes compression information permitting flexible compression and coordination of compressed information virtual to physical translation. In one embodiment, shared resource management system 100 manages accesses to a shared memory and the shared resource management unit 120 handles a plurality of contexts. In one exemplary implementation, the shared resource management unit also handles an access request to a memory that is associated with compressed data.

Figure 2A:
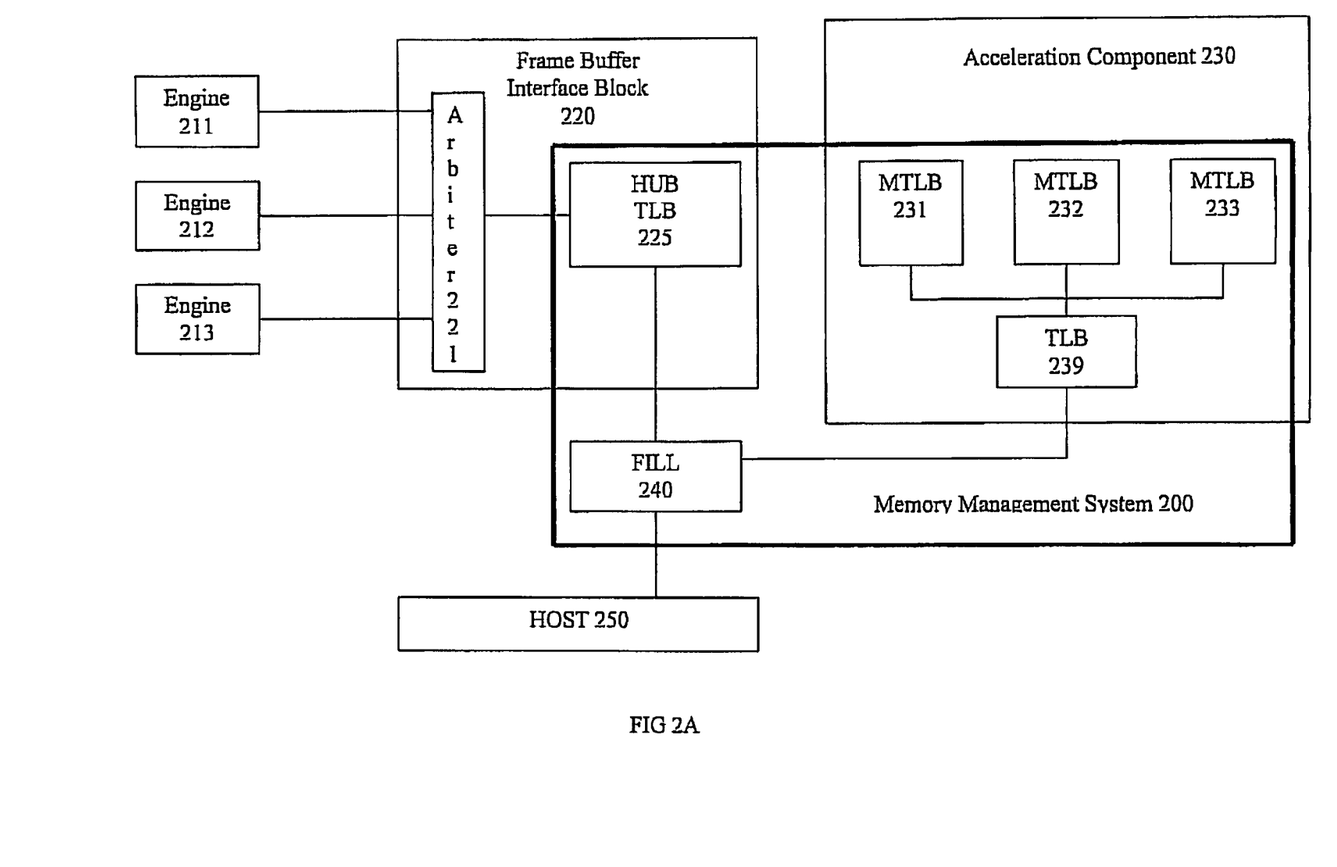
FIG. 2A is a block diagram of an exemplary memory management system in accordance with one embodiment of the present invention

FIG. 2A is a block diagram of exemplary memory management system 200, in accordance with one embodiment of the present invention. In one exemplary implementation, memory management system 200 is referred to as a memory management unit (MMU). Memory management system 200 facilitates efficient memory access. Memory management system 200 includes shared translation buffers (e.g., hub translation buffer TLB 225 and TLB 239), dedicated micro translation buffers (e.g., TLBs 231, 232 and 233) and fill component 240. Shared translation buffers and dedicated micro translation buffers translate virtual addresses to physical addresses. Fill component 240 coordinates memory accesses efficiently and independently including fetching page table entry information for translation lookaside buffers. If there is a miss in the translation (e.g., information is not stored in a current cache location) a notification is sent to the fill component 240. The fill component 240 puts together a memory request packet and forwards it to a memory (e.g., frame buffer, main memory, etc.) to retrieve translation data. In one embodiment, the fill component 240 can put together memory request packets associated with page table entries for translating between virtual and physical memory spaces.

Figure 2B:
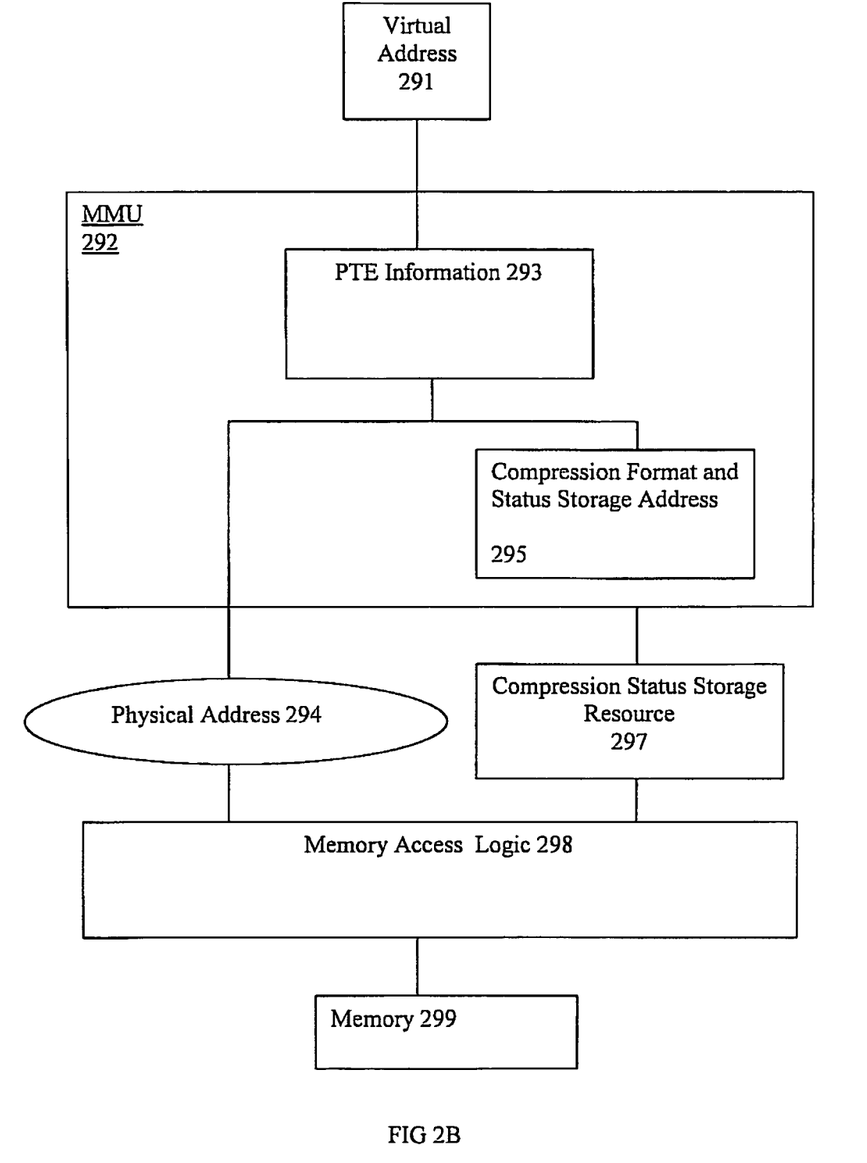
FIG. 2B is a block diagram of an exemplary virtual to physical space translation with compression in accordance with one embodiment of the present invention

In one embodiment, page table entries include a compression indication and address of compression related data. The page table entries associate a virtual address with an address of compression related information. In one embodiment, the memory management unit analyzes a page table entry to determine if the page table entry includes a compression format indicating compression. The memory management unit uses the compression format to determine number of compression bits per compressible unit or tile. It then calculates an offset address into the compression status storage. This offset is added to the compression status starting address in the PTE for that page. The memory management unit then forwards both the physical address translation and an address corresponding to the compression status address in the compression status storage resource. For example, the memory management unit forwards an address corresponding to a compression status storage address (e.g., an offset address into a corresponding compression status storage page). In one exemplary implementation, the memory management unit looks up the page table entry and then pipes through both addresses. In one embodiment, one of the two addresses is to the memory location in a DRAM and the second address is to where it looks to find the compression status in a compression status storage resource FIG. 2B is a block diagram of an exemplary virtual to physical space translation with compression in accordance with one embodiment of the present invention. A virtual address 291 is received by memory management Unit 292. In one embodiment, memory management unit 292 is similar to memory management unit 200. Memory management unit 292 looks up the corresponding virtual to physical address translation information and compression format and compression status starting address in PTE information 293. It is appreciated that PTE information 293 can be retrieved from a translation lookasided buffer, retrieved by a fill component, etc. The compression format and compression status storage address is forwarded to compression status storage address resolution component 295 which calculates an offset and adds it to a base compression format or status storage resource address. The resulting compression status storage address is utilized to access the compression status from compression status storage resource 297. The physical address and compression status is forwarded to memory access logic 298 which accesses the data from memory 299.

In one embodiment, allocation of compression status storage is not sequential. It is appreciated that the present invention is readily adaptable to services of different types packed together and compression ratios that are variable. In one embodiment, a memory management unit component examines a page table entry to determine how many compression bits are utilized. In one exemplary implementation, a page table entry includes a compression format field. For example, the page table compression format field can include a value of 1 indicating a 4 to 1 compression ratio or a 2 indicating an 8 to 1 compression ratio, and if the field is 0 it indicates the information is not compressed.

In one embodiment, memory management system 200 is included in a graphics system. The graphics system includes engine 211, engine 212, and engine 213, buffer interface block 220, acceleration component 230, fill component 240 and host 250. In one embodiment, the acceleration component 230 is dedicated to serving the graphics engine. Engine 211, engine 212, and engine 213, are communicatively coupled to frame buffer interface block 220, which is communicatively coupled to fill component 240. Fill component 230 in turn is communicatively coupled to acceleration component 230 and host 250.

The components of the graphics system cooperatively operate to perform graphics processing memory accesses. Engines 211, 212 and 213 process graphics information. Frame buffer interface block 220 enables efficient and independent access to a frame buffer. Arbiter 221 selectively arbitrates access requests from engines 211, 212, and 213 and forwards selected access requests to Hub TLB 225. Hub TLB 225 translates between virtual addresses and physical addresses. Acceleration component 230 enables accelerated processing of graphics information. In one embodiment, MTLBs 231, 232 and 233 handle translations between virtual and physical memory spaces in a level 1 cache and TLB 239 handles memory translations between virtual and physical memory spaces in a level 2 cache, where the TLB is a level 2 cache. Fill component 240 coordinates memory accesses independently as set forth above. Host 250 issues interrupts including interrupts for handling memory access faults.

Figure 3:
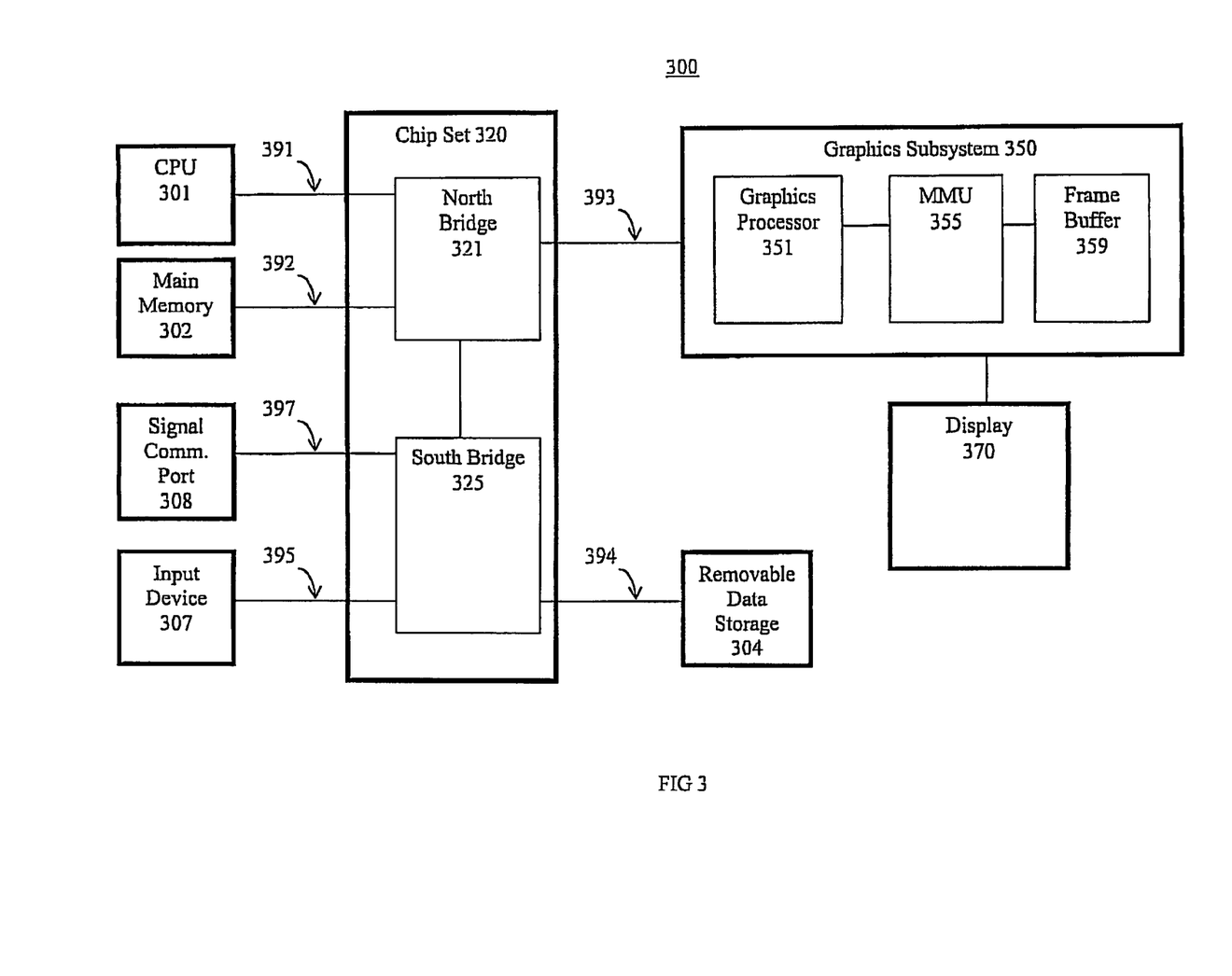
FIG. 3 is a block diagram of a computer system, one embodiment of a computer system upon which embodiments of the present invention can be implemented.

FIG. 3 is a block diagram of a computer system 300, one embodiment of a computer system upon which embodiments of the present invention can be implemented. Computer system 300 includes central processor unit 301, main memory 302 (e.g., random access memory), chip set 320 with north bridge 321 and south bridge 325, removable data storage device 304, input device 307, signal communications port 308, and graphics subsystem 350 which is coupled to display 370. Computer system 300 includes several busses for communicatively coupling the components of computer system 300. Communication bus 391 (e.g., a front side bus) couples north bridge 321 of chipset 320 to central processor unit 301. Communication bus 392 (e.g., a main memory bus) couples north bridge 321 of chipset 320 to main memory 302. Communication bus 393 (e.g., the Advanced Graphics Port interface) couples north bridge of chipset 320 to graphic subsystem 350. Communication buses 394-397 (e.g., a PCI bus) couple south bridge 325 of chip set 320 to removable data storage device 304, input device 307, signal communications port 308 respectively. Graphics subsystem 350 includes graphics processor 351, memory management unit 355 and graphics buffer 359.

The components of computer system 300 cooperatively operate to perform a variety of processing tasks and facilitate efficient memory accesses. Communications bus 391, 392, 393, 394, 395 and 397 communicate information. Central processor 301 processes information. Main memory 302 stores information and instructions for the central processor 301. Removable data storage device 304 also stores information and instructions (e.g., functioning as a large information reservoir). Input device 307 provides a mechanism for inputting information and/or for pointing to or highlighting information on display 370. Signal communication port 308 provides a communication interface to exterior devices (e.g., an interface with a network). Display device 370 displays information in accordance with data stored in frame buffer 359. Graphics processor 351 processes graphics commands from central processor 301 and provides the resulting data to graphics buffers 359 for storage and retrieval by display monitor 370. Memory management unit 355 handles the memory access requests between graphics processor 351 and graphics buffers 359. In one embodiment, memory management unit 355 is similar to memory management unit 200. It is appreciated that similar memory management units can be implemented to facilitate efficient and independent access requests to other memory components of computer system 300, including main memory 302 and bulk data storage 304.

It is appreciated that the present invention can be implemented in a variety of embodiments. In one exemplary implementation the present invention can be utilized in processing systems utilized to provide a variety of graphics applications including video games. For example, the present invention can be utilized for virtual to physical address translation and to facilitate information compression in a game console, personal computer, personal digital assistant, cell phone or any number of platforms for implementing a video game. It is also appreciated that references to video game application implementations are exemplary and the present invention is not limited to these implementations.

Figure 4:
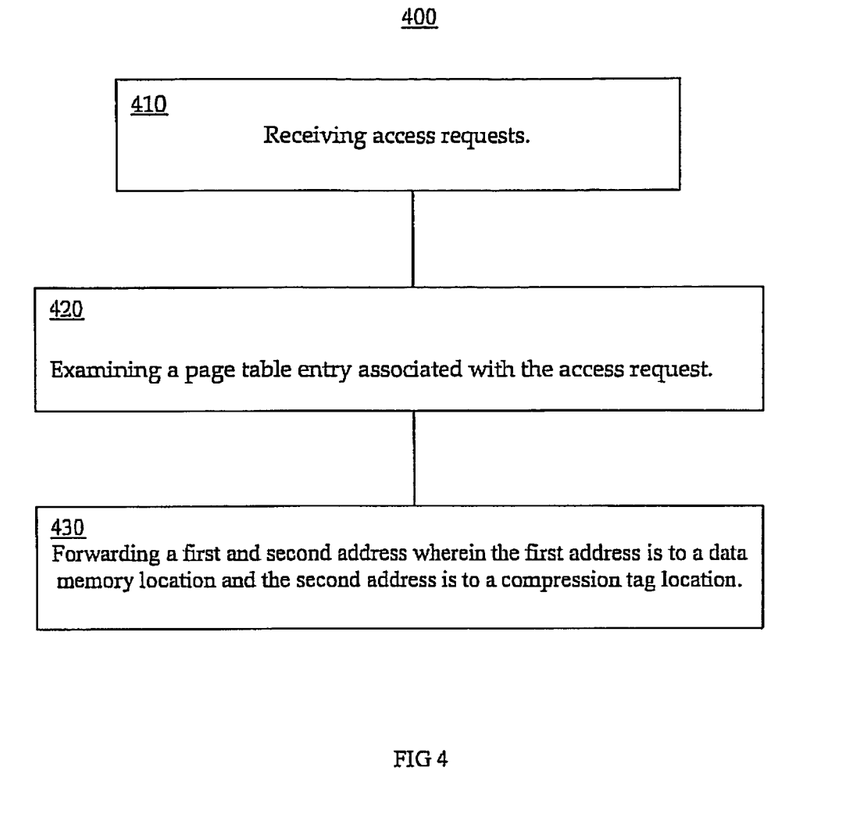
FIG. 4 is a flow chart of an exemplary memory management method in accordance with one embodiment of the present invention.

FIG. 4 is a flow chart of memory management method 400 in accordance with one embodiment of the present invention. Memory management method 400 facilitates efficient and independent memory accesses associated with compressed data.

At block 410, a plurality of access requests are received. In one embodiment, the plurality of access requests are from a plurality of clients. It is appreciated the access requests can be directed to various MMU units. In one embodiment, level 1 cache memory units (e.g., micro TLB, Hub TLB, etc.) receive access requests and after MMU translation the request has an aperture field which notifies a frame buffer interface which destination the request should be forwarded to (e.g., frame buffer memory, dedicated memory, main system memory, etc.). One of the pluralities of access requests can be from a first engine and another one of the plurality of access requests can be from a second engine At block 420, a page table entry associated with the access request is examined. In one embodiment, a determination is made if the page table entry includes compression related information. In one exemplary implementation, the page table entry is parsed to extract a page table entry indicating the address data and the address of information associated with the compression of the data. For example, a translated physical address of data and an address of compression status information.

A first address and second address are forwarded in block 430, wherein the first address is to a data memory location and the second address is to a compression tag location. In one embodiment, the first address is in a DRAM and the second address is in TAG RAM. The compression status storage resources can be allocated on the fly to achieve maximized utilization. In one embodiment a compression offset is added to a base compression status address.

In one embodiment, when information is no longer compressed the compression bits are freed up. In one exemplary implementation, when a surface is "destroyed" or no longer rendered the compression bits associated with the surface are freed up and page table entry information associated with the compression is updated accordingly.

Figure 5:
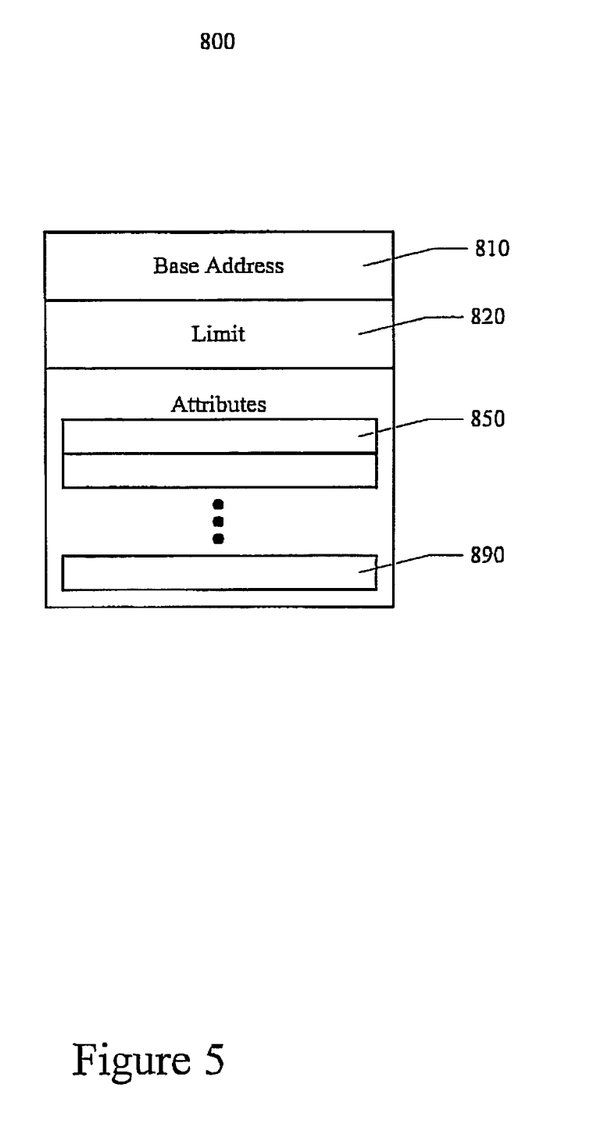
FIG. 5 is a block diagram illustration of an exemplary context specifier in accordance with one embodiment of the present invention.

Referring now to FIG. 5, a block diagram illustration of a context specifier 800, in accordance with one embodiment of the present invention, is shown. The context specifier 800 is a data structure that stores a base address 810, a limit 820, and one or more attributes 850, 890, etc. The attributes can include an indication the corresponding data associated with the context specifier is compressed and an address of compression related information.

Figure 6:
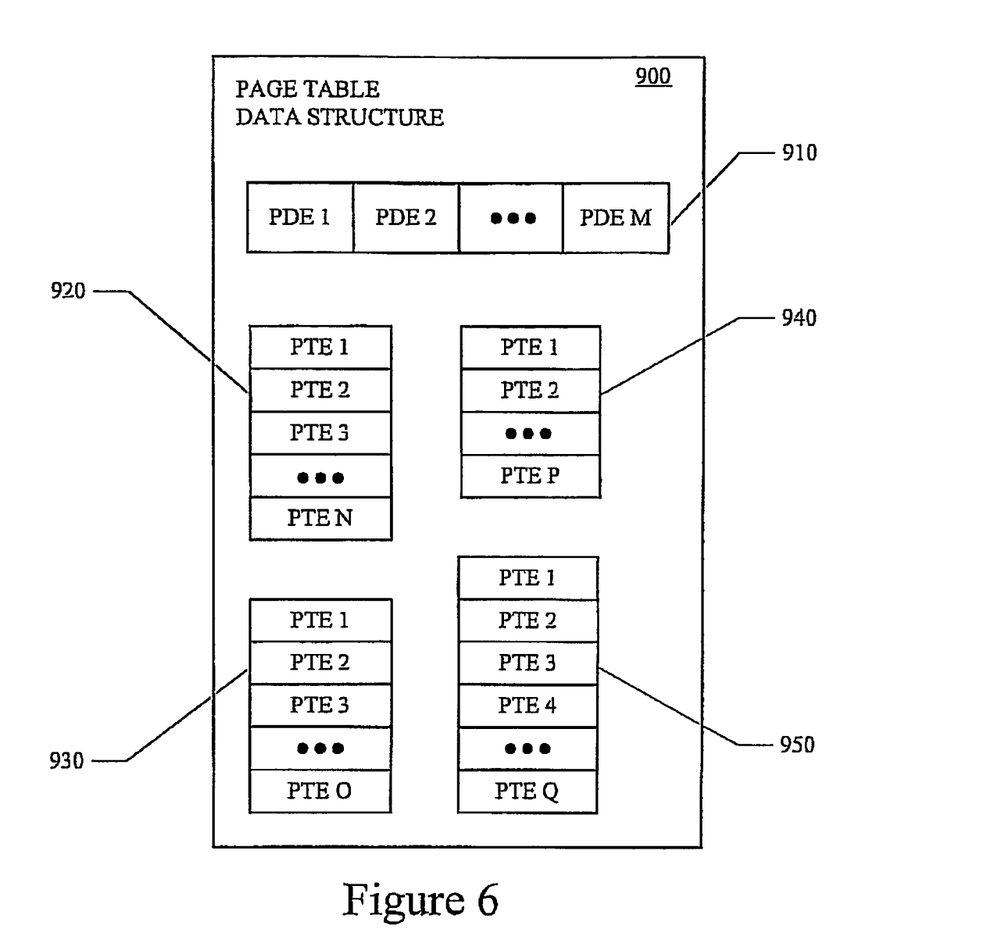
FIG. 6 is a block diagram of an exemplary page table data structure in accordance with one embodiment of the present invention.

FIG. 6 is a block diagram of an exemplary page table data structure 900 in accordance with one embodiment of the present invention. The illustrated two-level page table data structure 900 may include a page directory 910 and one or more page tables 920-950. The page directory 910 includes a plurality of page directory entries (PDE). Each PDE includes the address of a corresponding page table 920-950. Each PDE may also include a plurality of attributes. Each page table 920-950 includes one or more page table entries (PTE). Each PTE includes a corresponding frame number (e.g., physical page number). Each PTE may also include a plurality of attributes such as a dirty bit, an accessed bit, a page check disable bit, a page write transparent bit, a user accessible bit, a writeable bit, a present bit, a referenced bit, a hash function identification bit, a valid bit, an address compare bit, a changed bit, storage control bits, a no execute bit, page protection bits and/or the like. One or more of the attributes in the PDE and/or PTE may be the same attributes contained in the context specifier 800. For example, in one implementation, the attributes in the context specifier includes all of the attributes in the PTEs.

Figure 7:
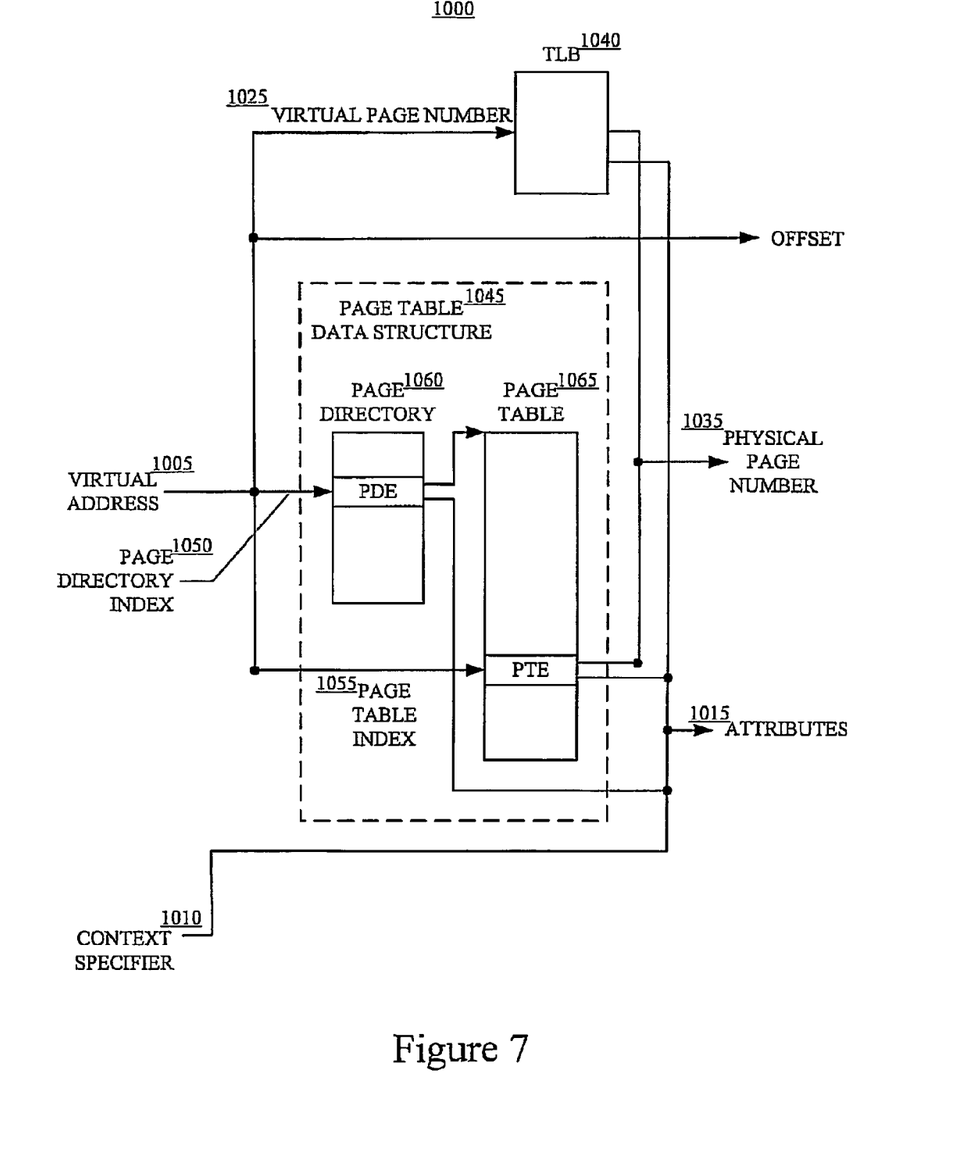
FIG. 7 is a block diagram of an exemplary system for translating virtual addresses to physical addresses in accordance with one embodiment of the present invention.

With reference now to FIG. 7, a block diagram of an exemplary system for translating virtual addresses to physical addresses in accordance with one embodiment of the present invention is shown. In one exemplary implementation, a virtual address 1005 and a context specifier 1010 are received. The context specifier 1010 includes one or more attributes 1015. The virtual address 1005 includes a virtual page number.

In one exemplary implementation, the virtual address 1050 is translated using a page table data structure 1045 which may be cached in TLB 1040. In particular, if a TLB 1040 includes a valid virtual-to-physical page mapping for the virtual page number 1025 (e.g., TLB hit) the appropriate physical page number 1035 is output from the TLB 1040. When the virtual page number 1025 is mapped to a given physical page number 1035 using the TLB 1040, the attributes used in the address translation process and/or output for use in accessing the memory may use attributes 1015 contained in the TLB 1040 or attributes of the context specifier 1010.

However, if the TLB 1040 does not include a valid mapping (e.g., TLB miss), the virtual address 1005 is translated using a page table data structure 1045. More specifically, the virtual page number 1025 includes a page directory index 1050 and a page table index 1055. The page directory index 1050 in the virtual address 1005 is used to index a given page directory 1060. The page directory entry (PDE) indexed by the page directory index 1050 includes an address of a given page table 1065. The page table index 1055 in the virtual address 1005 is used to index the given page table 1065 located at the address specified in the PDE. The page table entry (PTE) indexed by the page table index 1055 includes the physical page number 1035. When the virtual page number is translated to a given physical page number 1035 using the page table data structure 1045, the attributes 1015 used in the address translation process and/or output for use in accessing the memory may be attributes 1015 specified in the given PDE and/or PTE, or attributes 1015 of the context specifier 1010.

In one embodiment, the present invention includes a page table entry override capability. If the page table entry override capability is engaged an adjustment in the attributes of a context specifier is utilized in determining the physical page number.

It is appreciated embodiments of the present invention can facilitate greater flexibility in storage of virtual addresses translation information including corresponding compression information. Conventional approaches utilizing tile registers are typically limited predetermined associations with a certain range in a physical address. By utilizing page table entry indication of compression information, embodiments of the present invention are not necessarily limited to predetermined associations with certain ranges in a physical address and permit greater granularity in allocating compression information.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A shared resource management system comprising:
   a plurality of engines for performing processing;
   a memory for supporting said processing; and
   a memory management unit for handling an access request to said memory that is associated with compressed data, wherein said memory management unit analyzes a page table entry to determine if said page table entry includes compression format information and compression status address information.

2. A shared resource management system of claim 1 wherein said memory management unit forwards an address corresponding to said compression status.

3. A shared resource management system of claim 2 wherein said memory management unit forwards an address corresponding to a compression status storage resource address.

4. A shared resource management system of claim 1 wherein said memory management unit looks Lip the page table entry and then after that said memory management unit pipes through two addresses.

5. A shared resource management system of claim 4 wherein a first one of said two addresses is to a memory location in a DRAM.

6. A shared resource management system of claim 4 wherein a second address of said two addresses is to the compression status in a compression status storage resource.

7. A memory management method comprising:
   receiving by a memory management unit an access request;
   examining by said memory management unit a page table entry associated with said access request; and
   forwarding by said memory management unit a first address and a second address wherein said first address is to a data memory location and said second address is to a compression status storage location.

8. A memory management method of claim 7 wherein said first address is in a DRAM.

9. A memory management method of claim 7 wherein said second address is in a compression status storage resource.

10. A memory management method of claim 7 further comprising managing compression status storage resources directly with software.

11. A memory management method of claim 10 further comprising allocating compression status storage resources on the fly to achieve maximized utilization.

12. A memory management method of claim 10 further comprising issuing a fault error if said request generates an error.

13. A memory management method of claim 10 further comprising adding a compression offset to a base compression status storage address.

14. A memory management component comprising:
   a shared translation lookaside buffer for translating virtual address to physical addresses; and
   a fill component for coordinating memory access requests associated with compressed data; wherein a page table entry fetched by said fill component is analyzed to determine if said page table entry includes compression format information and compression status address information.

15. A memory management component of claim 14 further comprising a compression status storage address resolution component which calculates an offset and adds it to a status storage resource address in a compression status storage resource wherein allocation of said compression status storage resource is not sequential.

16. A memory management component of claim 14 wherein said shared translation lookaside buffer is utilized for services of different types are packed together.

17. A memory management component of claim 15 wherein compression ratios for said compressed data are variable.

18. A memory management component of claim 17 wherein said fill component examines a page table entry to determine how many compression bits are utilized.

19. A memory management component of claim 17 wherein a page table entry includes a compression format indication field indicating a compression ratio for said compressed data.

* * * * *